US007620052B2

(12) United States Patent
Witzel et al.

(10) Patent No.: US 7,620,052 B2
(45) Date of Patent: Nov. 17, 2009

(54) METHOD AND NODE FOR SELECTING A CODEC TYPE OR CONFIGURATION BY EXTENDING THE LIST COMPRISING CODECS FOR TRANSCODER/TANDEM FREE OPERATION BY FURTHER CODECS SUPPORTED BY THE NODE

(75) Inventors: Andreas Witzel, Herzogenrath (DE); Karl Hellwig, Wonfurt (DE); Dirk Kampmann, Vaals (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 449 days.

(21) Appl. No.: 10/598,492

(22) PCT Filed: Mar. 4, 2004

(86) PCT No.: PCT/EP2004/002229

§ 371 (c)(1),
(2), (4) Date: Aug. 31, 2006

(87) PCT Pub. No.: WO2005/096585

PCT Pub. Date: Oct. 13, 2005

(65) Prior Publication Data

US 2007/0171841 A1    Jul. 26, 2007

(51) Int. Cl.
*H04L 12/28* (2006.01)

(52) U.S. Cl. ................................. 370/395.21

(58) Field of Classification Search .............. 370/231, 370/360, 401, 229, 469, 395, 352, 535, 465, 370/255, 343, 320, 221; 704/221; 709/231
See application file for complete search history.

(56) References Cited

U.S. PATENT DOCUMENTS 6,671,367 B1    12/2003   Dikic et al.
2003/0210659 A1*  11/2003   Chu et al. ................... 370/320
2004/0095958 A1   5/2004   Xie et al.

FOREIGN PATENT DOCUMENTS

| WO | WO 01/06800 A | 1/2001 |
| WO | WO 03/032585 A | 4/2003 |
| WO | WO 03/092312 A | 11/2003 |

* cited by examiner

*Primary Examiner*—Frank Duong

(57) ABSTRACT

The invention is related to a method for transmitting data in a telecommunications network and a device, e.g. a network node, utilizing that method, where said data transfer requires the application of algorithms for coding and/or decoding ("codec") on said data, where at least one of said network nodes provides a list (25) of available codecs and transmits it to a further network node, where said further network node chooses from the received list (25) and from a corresponding set of codecs available to the further network node a combination of codecs to be used when transferring said data, and where the received list (25) not only comprises direct codecs (28) but transcoding codecs (29), i.e. codecs requiring transcoding, as well.

18 Claims, 12 Drawing Sheets

METHOD AND NODE FOR SELECTING A CODEC TYPE OR CONFIGURATION BY EXTENDING THE LIST COMPRISING CODECS FOR TRANSCODER/TANDEM FREE OPERATION BY FURTHER CODECS SUPPORTED BY THE NODE

BACKGROUND

The present invention relates to data transmissions over a telecommunications network, and more particularly to the transmission of data in a cellular telecommunications network. The invention further relates to a device utilising that method.

In telecommunications networks such as GSM (Group System for Mobile Communication) and UMTS (Universal Mobile Telecommunication System) and UTRAN (Universal Telecommunication Radio Access Network), in which WCDMA (Wideband Code Division Multiple Access) is one radio transmission method, the transferred data, e.g. speech data, is compressed before it is transported over the radio interface. This reduces the bandwidth demands on the scarce resource radio interface. To achieve this compression, codecs (coder and decoder algorithms as well as a means provided for performing that algorithm) are used. As these codecs do not work lossless, the number of transcoding stages within the telecommunications core network has to be minimized in order to maximize data quality. In the following data quality in the meaning of this application is the quality of audio or video data.

In GSM-type networks the BSS (Base Station sub-System), specifically the TRAU (Transcoding and Adaption Unit), termed as "transcoder unit" in the following, is responsible of converting the compressed speech to PCM (Pulse Code Modulation), which is then used on the A-interface towards the core network.

In UTRAN-type networks the responsibility of converting the compressed speech to PCM lies in the telecommunications core network, specifically the MGW (Media Gateway). Therefore the point where in the core network this conversion is done can be negotiated amongst the involved call control nodes. This negotiation is done using OoBTC-procedures (Out of Band Transcoder Control). In the ideal case of a call between two UTRAN terminals, compressed speech is transported end-to-end between the terminals without any additional transcoding on the path. This is called Transcoder Free Operation (TrFO). TrFO allows for substantially reduced bandwidth demands in the core network and achieves optimal speech quality. A detailed description can be found in the technical specification 3GPP TS 23.153.

For GSM access a similar mechanism can be used called Tandem Free Operation (TFO). In a call between two GSM terminals two transcoder units in the BSS are involved. After the call is established, these two transcoder units negotiate via inband messages by stealing bits from the PCM stream. If compatible codecs are used on both sides, compressed speech can be exchanged between both transcoder units. TFO does not reduce the bandwidth demands on the core network but achieves the same optimal speech quality. More information can be found in the technical specification 3GPP TS 28.062.

The two mechanisms, TFO for GSM and OoBTC/TrFO for UMTS and UTRAN, have been harmonized and can be combined in order to improve the quality of calls between GSM and UTRAN terminals.

SUMMARY

The object of the invention is to provide optimal data quality, e.g. speech quality, and/or to minimize the bandwidth needs in the telecommunications core network.

Optimal data quality is achieved by minimizing the number of transcoding stages, and if unavoidable, by transcoding in a way that affects data quality as little as possible. Optimal data quality does also mean to select the optimal codec type for the call. Minimizing the bandwidth needs is achieved by choosing a codec that uses less bandwidth provided that there is a choice between at least two possible codecs. Sometimes optimal quality and minimal bandwidth are contradicting requirements. The proposed method provides tools to handle this according to given preferences.

Therefore the invention provides a method that can be executed by a node in a telecommunications network, especially a network node acting as media-gateway (MGW). The node can participate in a communications path between at least two terminating devices. A terminating device can be a mobile terminal or a server. The communication path is used for transferring media data, i.e. audio data, video data or a combination of both, and said media data is subject to a coding or decoding or both. Coding and decoding are performed by a codec. The method comprises the step of receiving information about codec types or configurations or both supported on a section of the communication path from the node to a terminating device. It further comprises the step of comparing said information with information about codec types or configurations or both supported by the node, and a step of providing a list of codec types or codec configurations or both supported directly. Directly supported means, that is supported by the terminating device, that it is supported by all network nodes in the section of the communication path involved in coding or decoding or both of said data, and that it is supported by the node itself.

The list further comprises codec types or configurations or both that can be used for coding or decoding or both if at least one transcoding is implemented in the communication path.

In an embodiment of the invented method, codec types or configurations or both that are supported directly form a first part (28) of the list and codec types or configurations or both that can be used only if a further transcoding is implemented form a second part of the list. These two parts of the codec list are separated by a separator.

Such separator can be for example a default codec type like PCM.

The invention further provides a node for being used in a telecommunications network, especially a network node acting as media-gateway. Said network node can participate in a communication path for transferring media data, wherein media data is audio data or video data or a combination of both. The transferring is performed between terminating devices, wherein a terminating device is a mobile terminal or a server. The node comprises a codec for coding or decoding or both of said media data. It further comprises an input/output unit for sending and receiving messages. The node comprises furthermore a comparing unit for comparing information about supported codec types or configurations or both supported by all nodes involved in coding or decoding or both on a section of the communication path from the node to a terminating device and supported by the terminating device, with information of codec types or configurations or both supported by the node itself. The node comprises as well a generation unit for generating a list of codec types or configurations or both supported by each node of said section of the communication path, supported by the terminating device, and supported by the node itself. The list of codec types or configurations or both generated by said generation unit further comprises codec types and configurations that can be used for coding or decoding only if a transcoding (29) is implemented in the communication path.

In an embodiment of the invention, the generation unit of the node generates a list in which the codec types and configurations that are supported by the terminating device, all network nodes involved in coding or decoding of said media data on the section of the communication path, and the node itself form a first part of the list, and a further part of the list comprises codec types and configurations that can be used for coding or decoding or both of the media data if a transcoding is implemented in the communication path. The two parts of the list are separated by a separator.

The invention provides a method for selecting at least one of a coder or decoder type or configuration or both for coding or decoding media data. Media data is audio data or video data or a combination of both. The media data is to be transferred over a communication path between a first and a second terminating device, wherein a terminating device is a mobile terminal or a server, engaged with a telecommunications network. The network comprises at least a first and a second network node that are linked into the communication path. The communication path comprises a first call leg to the first terminating device and a second call leg to the second terminating device. The method comprises the steps of receiving or generating a first list of codec types or configurations or both for the first call leg, and receiving or generating a second list of codec types or configurations or both for the second call leg. The first and the second list each comprise a first part with codec types or configurations or both supported by all nodes involved in coding or decoding of media data transferred on the respective call leg and supported by the respective terminating device, and a second part comprising codec types or configurations or both that can be used only if at least one transcoding is implemented in the call leg. The method further comprises the steps of comparing the first and the second list, selecting a codec type or configuration or both from the first list, and selecting a codec type or configuration or both from the second list.

In an embodiment of the invention the method comprises the additional step of determining that the first part of the first list and the first part of the second list each comprise at least one codec type or codec configuration, and the comparing step is performed by comparing the first part of the first list with the first part of the second list.

In a further embodiment of the invention, the method comprises the additional step of determining that either the first part of the first list or the first part of the second list does not comprise any codec type or configuration, and the comparing step is performed by comparing the first part that comprises at least one codec type or configuration with the second part of the respective other list.

In a further embodiment of the invention the method comprises the additional step of determining that none of the lists comprises a first part with at least one codec type or configuration. The comparing step is performed by comparing the second part of the first list with the second part of the second list.

In a preferred embodiment of the invention are the selecting steps are performed by evaluating a priority table.

The priority table can be a matrix in the form of a triangular matrix comprising elements along its diagonal referring to transcoder free transmission and further elements in the upper or lower triangular referring to transmission of date where transcoding is required.

The invention further introduces a device for selecting at least one of a coder or decoder type or configuration or both for coding or decoding or both of media data. Media data is audio data or video data or a combination of both, that is to be transferred over a communication path between a first and a second terminating device. A terminating device is a mobile terminal or a server, engaged with a telecommunications network. The telecommunications network comprises at least a first and a second network node that are linked into the communication path. The communication path comprises a first call leg to the first terminating device and a second call leg to the second terminating device. The device comprises an input unit for receiving first list of codec types or configurations or both for the first call leg, and for receiving a second list of codec types or configurations or both for the second call leg. The device further comprises a comparing unit for comparing the first and the second list that is adapted to detect a separator separating a first part of a list with codec types or configurations or both supported by all nodes involved in coding or decoding or both of media data transferred on the respective call leg and supported by the respective terminating device, and a second part comprising codec types or configurations or both that can be used only if at least one transcoding is implemented in the call leg. The comparing unit is further adapted to detect if one or both of the lists do not comprise any codec type or configuration in the first part. The device further comprises a selecting unit for selecting a codec type or configuration or both from the first list and the second list according to a result of the comparing step.

In an embodiment of the invention, the device further comprises a storage for storing a priority table, and its selecting unit uses the contents of the priority table for selecting.

A "direct" codec is a codec that is supported by the terminal, the radio access network (RAN) and the MGW, where the radio access network is connected to.

A "transcoding" codec is any further codec that is in addition supported by the MGW, but not by the terminal or not by the RAN. Transcoding is the changing from one coding scheme according to a first codec type or configuration or both to another coding scheme according to another codec type or configuration or both performed by a transcoding codec.

The essential advantage of the invention is that a substantially improved selection of a codec combination becomes possible, while the selected codecs yield to improved data quality and/or reduced use of bandwidth.

Further the method is fully compliant to current specifications, i.e. changes are neither required with respect to the existing devices, e.g. the mobile terminals, the network nodes, etc., nor with respect to operational procedures to guarantee interworking. But the full advantage of the improved methods is only achieved, if MSC-Servers all support the method.

The dependent claims are directed to preferred embodiments of the invention, where especially choosing an optimal codec combination from a set of possible codec combinations is addressed. In the following the term 'codec' and 'codec combination' are used to describe the selection of a particular codec type, codec configuration or both. to increase the readability of the application the term codec is used instead.

BRIEF DESCRIPTION OF THE SEVERAL VIEWS OF THE DRAWINGS

A preferred embodiment of the invention is illustrated in the drawings. All the elements which are not required for the immediate understanding of the invention are omitted. In the drawing, the same elements are provided with the same reference numerals in the various figures, an in which.

DETAILED DESCRIPTION

Figure 1:
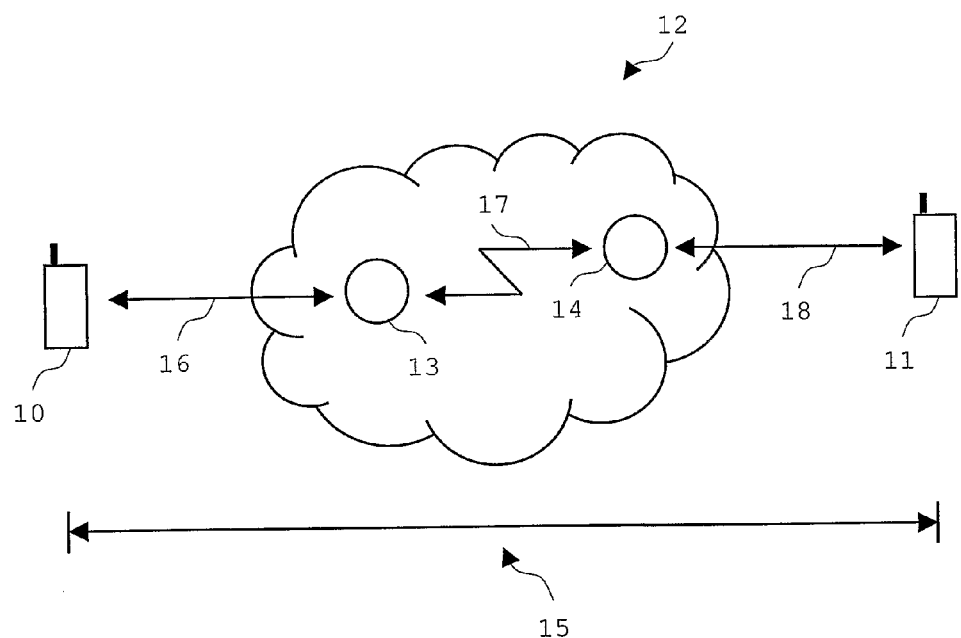
FIG. 1 is a schematic view of data transfer in a telecommunications network between individual communication participants.

FIG. 1 is a schematic view of a first and a second mobile terminal 10, 11 engaged in a communication. Said first and second mobile terminals 10, 11 are communicating with each other via a telecommunications network 12 comprising at least a first and a second network node 13, 14, where the first mobile terminal 10 is engaged with the telecommunications network 12 by means of the first network node 13 and where the second mobile terminal 10 is engaged with the telecommunications network 12 by means of the second network node 14. Said communication comprises the transfer of data, i.e. speech, etc., from or to the first mobile terminal 10 to and from the second mobile terminal 11. Both the mobile terminals 10, 11 as well as both the network nodes 13, 14 are termed "communication participants" 10, 11, 13, 14 in the following. Each of the network nodes 13, 14 is supposed to represent either a BSS (Base Station System) for GSM-type networks or PDC, DAMPS, cdmaOne, cdma2000 or a MGW (Media Gateway) for UMTS-type networks with UTRAN access. The link between the mobile terminals 10, 11 is termed "communication path" 15. The communication path 15 comprises at least said first and second network nodes 13, 14. However, with regard to the communication, i.e. the data transfer, inside the communications network 12, the communication path 15 may comprise further network nodes logically located along the communication path 15 between said first and second network nodes 13, 14. Data transfer between the communication participants 10, 11, 13, 14 is depicted by means of the double headed arrows, which are segments 16, 17, 18 of the communication path 15.

Figure 2:
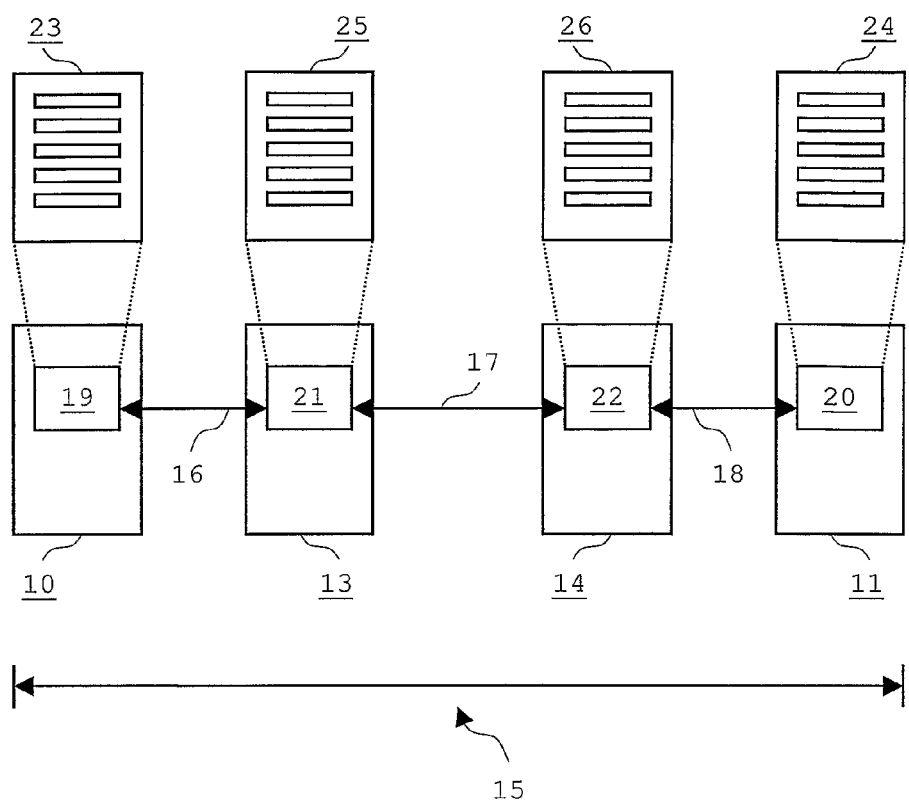
FIG. 2 is a schematic view of the data transfer between codecs comprised in the individual communication participants.

When transmitting data, e.g. speech data, along the communication path 15 the need arises for proper coding of the transmitted data. Proper coding may comprise compression and decompression of transferred data but at least encompasses coding in order to achieve optimal data quality, e.g. speech quality at efficient data bandwidth, especially on the radio interfaces. Coding and/or decoding may take place on every communication participant 10, 11, 13, 14 and is achieved by a codec 19, 20, 21, 22 (coder-decoder=codec [abbr.]) comprised in the respective communication participant 10, 11, 13, 14. Hence, the data transfer may also be regarded as a data transfer between the codecs 19-21-22-20 comprised in the communication participants 10, 11, 13, 14 involved, as depicted in FIG. 2.

Each codec 19-22 may support different codec types or configurations or both, i.e. methods or algorithms for coding and decoding. The set of codecs supported by a certain codec 19-22 is given in a codec list 23, 24, 25, 26 associated with the respective codec 19-22. When transmitting data along the communication path 15 the codecs 19-22 involved or the communication participants 10, 11, 13, 14 comprising said codecs 19-22 negotiate the use of certain codec with respect to the contents of the respective codec lists 23-26. All the lists 23-26 are supposed to comprise at least one common codec 27 (cf. FIG. 3), e.g. a PCM codec (PCM=pulse code modulation, described for example in ITU-T standard G.711). Said common codec 27 is a fallback position for coding/decoding along the communication path 15 if, when negotiating a codec, no other codec supported by all the codecs involved can be found.

However, employing said common codec 27 may lead to poor or sub-optimal communication results, i.e. reduced speech quality, increased bandwidth, etc.

Codec negotiation is carried out along the lines of following scheme, where for means of generalization the first mobile terminal 10 is termed the originating terminal 10, the first network node 13 is termed the originating node 13, the second network node 14 is termed terminating node 14 and the second mobile terminal 11 is termed terminating terminal 11:

Transmitting data between the originating terminal 10 and the originating node 13 as well as the terminating node 14 and the terminating terminal 11 is processed by using codec predetermined by the codec capabilities of the originating or terminating terminal 10, 11. These codec are termed access codecs. A list of access codecs is termed access codec list 23, 24. The access codec list 23 for the originating terminal 10 is the originating access codec list 23, the access codec list for the terminating terminal 11 is the terminating access codec list 24. When negotiating an applicable codec the originating node 13 prepares as codec list 25 of supported codecs, supported by both the originating terminal 10 and the originating node 13. This codec list 25 is a true subset of the originating access codec list 23 enlarged by the default codec type (e.g. PCM) or is identical to the originating access codec list 23 enlarged by the default codec type (e.g. PCM) and is termed hereinafter as originating supported codec list 25.

If, for example the originating terminal 10 supports the codec
  GSM EFR,
and the originating node 13 supports the codecs
  UMTS_AMR2
  GSM EFR
  PCM
then the originating supported codec list 25 prepared by the originating node 13 comprises the codecs
  GSM EFR
  PCM.

This originating supported codec list 25 is sent to the terminating node 14. The terminating node 14 chooses a codec to be applied during data transmission which is common to both the received originating supported codec list 25 and the terminating access codec list 24 or a codec list 26 maintained in the terminating node 14 representing the codec capabilities available on both the terminating node 14 as well as the terminating terminal 11, hereinafter termed as the terminating supported codec list 26. Again the default codec type (e.g. PCM) is added to this list.

If for example the terminating access codec list 24 comprises of the codecs
    GSM EFR then GSM EFR is common to both the received originating supported codec list 25 and the terminating access codec list 24 and is therefore selected as codec to be used when coding/decoding the data during transmission between the originating node 13 and the terminating node 14.

If no other common codec exist in the codec lists 24, 25, said at least on common codec 27, e.g. the PCM codec, will be used.

If, for example the originating terminal 10 again supports the codecs
    GSM EFR, and the originating node 13 as well supports the codecs
    UMTS_AMR2
    GSM EFR
    PCM then the originating supported codec list 25 prepared by the originating node 13 comprises of the codecs
    GSM EFR
    PCM.

If, however, the terminating terminal 11 is a UMTS-type mobile terminal, the terminating access codec list 24 may comprise the codecs
    UMTS_AMR2

PCM is common to both the received originating supported codec list 25 and the terminating access codec list 24 and is therefore selected as codec to be used when coding/decoding the data during transmission between the originating node 13 and the terminating node 14 in this case.

In other words, the currently specified codec list handling only allows finding end-to-end codecs, but not what would be possible via at least one transcoding step in the origination node 13 or the terminating node 14. As several codecs are incompatible, e.g. in GSM and UTRAN, or DAMPS, Cdma-One, cdma000, codec negotiation will often lead to selecting the fallback codec 27, e.g. the PCM codec, as described beforehand, which is suboptimal, when data quality and use of bandwidth is concerned. It should be noted that as stated above that the term codec is used as a synonym for codec type or configuration or both.

Accordingly the invention is intended to overcome such shortcomings. This is accomplished by adding additional codecs to the codec lists 25, 26 of the network nodes 13, 14 involved, which can be used via transcoding. The resulting codec lists 25, 26 are full lists of all codecs supported by the respective communication participants 13, 14. I.e., when selecting a codec to be applied when transmitting the data along the transmission path 15, not only codecs directly available (i.e. available in all nodes 19, 21, 22, 20) will be considered, but also codecs that become applicable when transcoding the data one time in the path 15.

Applied to the example before this will lead to the following situation:

The originating terminal 10 is a GSM-type mobile terminal and supports the codecs
    GSM EFR, The terminating terminal 11 is a UMTS-type mobile terminal and supports the codecs
    UMTS_AMR2

The terminating supported codec list 26 accordingly comprises the codecs
    UMTS_AMR2
    PCM supported by both the terminating terminal 11 and the terminating node 14, with the default codec type added.

Assuming that the originating node 13 supports the codecs
    GSM EFR
    PCM and additionally provides the codec
    UMTS_AMR2 after an appropriate transcoding of the data transferred, then the originating supported codec list 25 prepared by the originating node 13 comprises of the codecs
    GSM EFR
    PCM
    UMTS_AMR2.

When choosing an optimal codec from comparing this originating supported codec list 25 and the terminating supported codec list 26, then
    UMTS_AMR2 will be selected by the terminating node 14, since the codec UMTS_AMR2 is common to both lists 25, 26 and the codec PCM is but the suboptimal fallback position.

When it comes to choosing an optimal codec from the lists 25, 26 involved, i.e. when more than one common codec is in the lists 25, 26 apart from the fallback common codec 27, then priorities, e.g. numerical burdens, associated to each codec or any combination of codecs are evaluated, as will be described with reference to FIG. 3 to FIG. 6.

Figure 3:
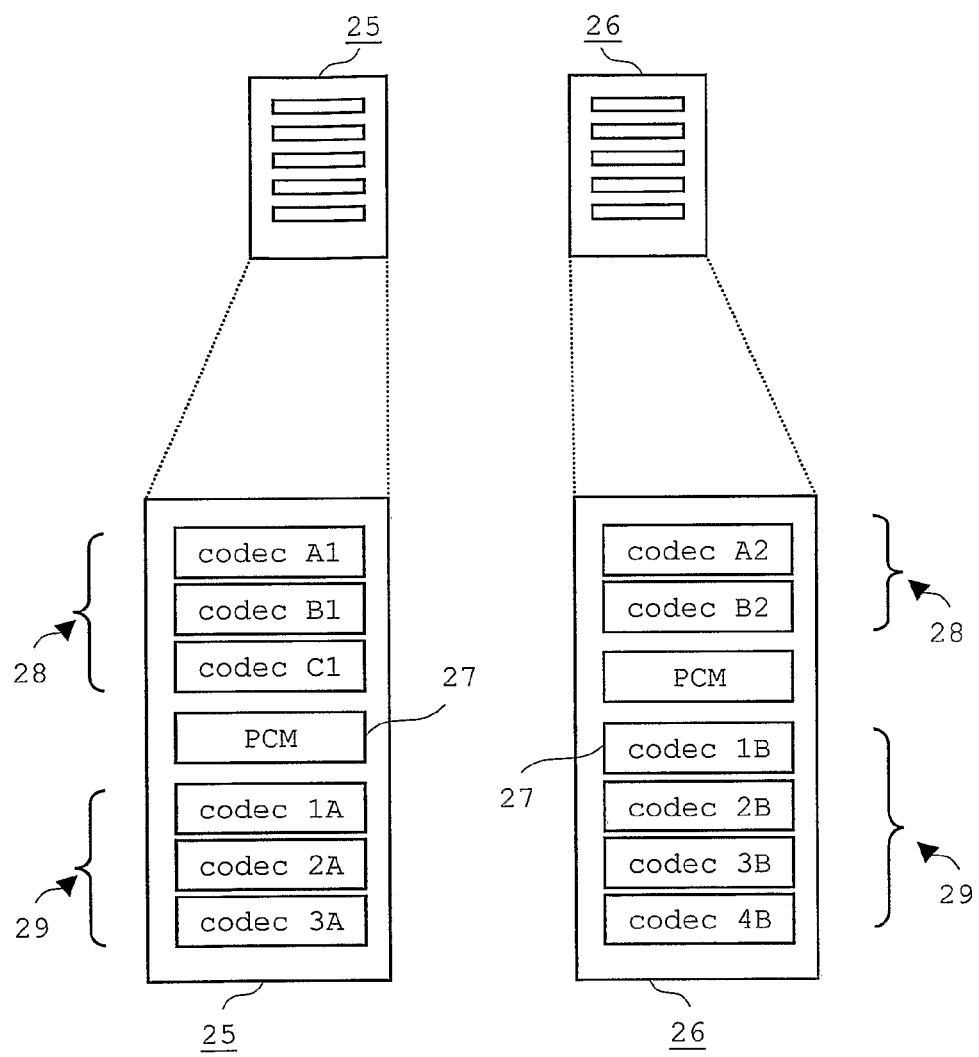
FIG. 3 to FIG. 6 is a depiction of exemplary situations when transferring data between individual communication participants with different examples of Codec Lists and a specific example of a Codec Type matrices (FIGS. 4 and 5) as could be found in 3GPP systems and FIG. 7

FIG. 3 shows an exemplary originating supported codec list 25 with a number of codecs "directly" supported 28 (codec A1, codec A2, codec A3), where directly supported means that all these codecs are available without prior transcoding, i.e. these direct codec types are present in the originating codec list 23 and are supported by the codec 21 in network node 13. The originating supported codec list 25 further comprises a number of codecs available after transcoding 29 (codec 1A, codec 2A, codec 3A). The codecs directly supported 28 and the codecs available after transcoding 29, hereinafter shortly termed as "direct codecs" 28 and "transcoding codecs" 29, are separated by the common codec 27, e.g. the PCM codec.

The codec list 26 on the right-hand portion of FIG. 3 is an exemplary terminating supported codec list 26, comprising a number of direct codecs 28 (codec A2, codec B2) and a number of transcoding codecs 29 (code 1B, codec 2B, codec 3B, codec 4B). Again the direct codecs 28 are separated from the transcoding codecs 29 by the common codec 27, e.g. the PCM codec.

In the example as shown the codec capabilities of the communication participants 10, 13, 14, 11 involved would result to the following possible combination of codecs:
    Codec A1+Codec A2
    Codec A1+Codec B2
    Codec B1+Codec A2
    Codec B1+Codec B2
    Codec C1+Codec A2
    Codec C1+Codec B2

Figure 4:
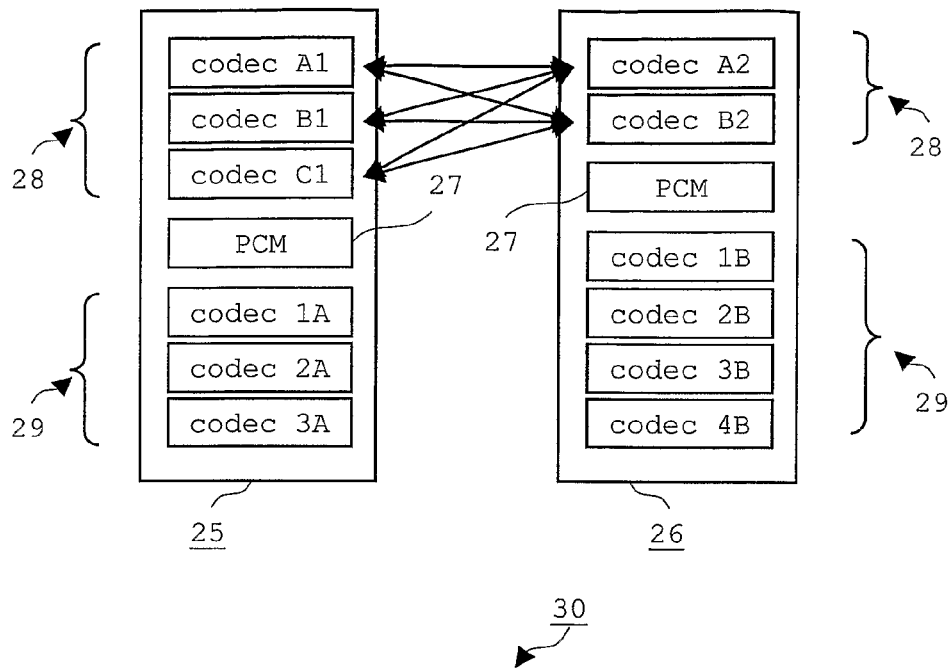

Then the priority of each of those codec combinations is for example determined with the help of a predefined, speech quality based on a priority table 30 as shown in FIG. 4. The priority in that table 30 is set in a way that a combination of codecs resulting into better speech quality has a higher priority, i.e. a lower numerical value. Then the respective priorities of all possible combinations of codecs are compared and the combination of codecs with the highest priority, i.e. lowest numerical value, is selected. As all cross points of the priority table 30, which apparently has the form of a triangular matrix, are filled with values, it is always possible to select a combination of codecs. The only prerequisite is that direct codecs 28 are present in both lists 25, 26.

Other examples of determining the optimal codec type combination exists, one of such methods could be to select the codec type with the lowest peak bit rate on the communication path 17, or to select the codec type with the lowest average bit rate, or to prefer the first codec in the originating codec list 25, or to prefer the first codec type in the terminating codec list. Other criteria could be to select the codec type that creates the least processing load, or the least processing load in node 14.

An aspect of the invention is that the two codec lists are divided into the direct codec types and the transcoding codec types.

The division of the codec lists enables to select a codec type with no transcoding (common in both direct codec lists) or with maximally one transcoding (selected codec type included in one of the direct codec lists).

When considering an exemplary correlation of codecs from FIG. 3 to the rows and the columns of the priority table 30 as follows
    Codec A1→AMR2 (set 14)
    Codec B1→AMR2 (set 10)
    Codec C1→GSM EFR
and
    Codec A2→AMR-WB (set 0)
    Codec B2→AMR2 (set 12)

this will lead to the following priority values for all possible combinations of direct codecs 28:
    Codec A1+Codec A2→X:6
    Codec A1+Codec B2→- - -
    Codec B1+Codec A2→X:7
    Codec B1+Codec B2→C:5
    Codec C1+Codec A2→X:8
    Codec C1+Codec B2→X:9.

Hence, in the exemplification, the combination of codecs "Codec B1+Codec B2" is selected, for "5" is the lowest numerical value and therefore that combination of codecs is assigned the highest priority.

Along with the priority entry in the priority table 30, there is information on whether a certain combination of codecs can interwork without transcoding (indicated by characters 'F' and 'C', where 'F' stands for "TFO or TrFO" and 'C' stands for "compatible") or require transcoding (indicated by characters 'X' and 'S', where 'X' stands for "transcoding necessary" and 'S' stands for "via SID-transcoding"). So if a combination of codecs with 'F' or 'C' is selected, the call, i.e. the data transmission along the communication path 15, will be transcoder free (TrFO).

If, however, a combination of codecs with 'X' or 'S' is selected, transcoding is required. In this case an additional decision is required about the place of transcoding, i.e. whether to transcode in the originating node 13 or the terminating node 14. In order to make this decision the transcoding capabilities of both the nodes 13, 14 involved, are checked, i.e. the transcoding codecs are compared with the selected combination of codecs. If the transcoding capabilities of both the nodes 13, 14 involved allow for placing the transcoding in either of the nodes 13, 14, then for example the node is selected for transcoding, which results in the lower bandwidth in the core network. Otherwise, i.e. if the transcoding capabilities of both the nodes 13, 14 involved allow only on placement of the transcoding, the respective node 13, 14 capable of performing transcoding as required is selected. Other methods for selecting the optimal codec type are described above.

Figure 5:
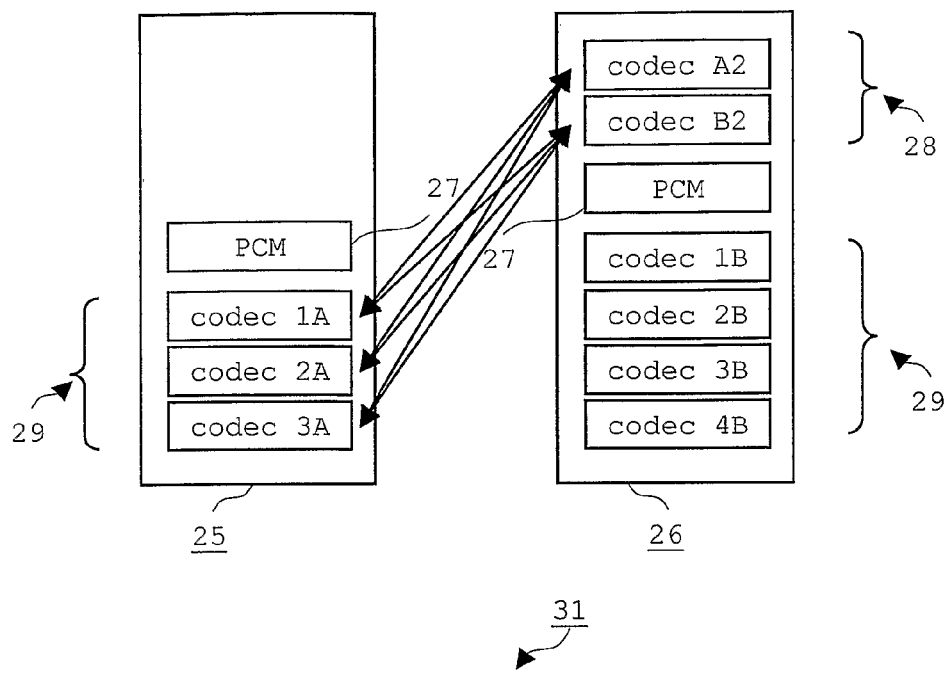

In the case that the originating supported codec list 25 received in the terminating node 14 does not contain any direct codecs 28, this means that the originating node 13 has to transcode anyway, regardless of what the terminating side, i.e. the terminating node 14, decides. Therefore all the local, i.e. the terminating, direct codecs 28 are checked against the distant, i.e. the originating, transcoding capabilities as shown in FIG. 5. However, in contrast to the previously used priority table 30 (cf. FIG. 4) a modified priority table 31 with only diagonal cross points filled is applied, i.e. it is allowed only to select a codec that is common to the terminating direct codec list and the originating transcoding list. As the originating node 13 has to transcode anyway and the overall objective restricts the solution to only one transcoding stage, the codecs on the terminating side, i.e. the codecs applied on the terminating terminal 11 and the terminating node 14, have to be the same or compatible (cf. entry "C:5" alongside the diagonal of the modified priority table 31).

Another special case is if the terminating supported codec list 26 does not contain any direct codecs 28 (not shown). Then the same mechanism as described beforehand and the same modified priority table 31 shall be used. This time only a codec type, which is common to the originating direct codec list and the terminating transcoding codec list, can be selected to fulfil the requirement of only one transcoding in the path 15.

Figure 6:
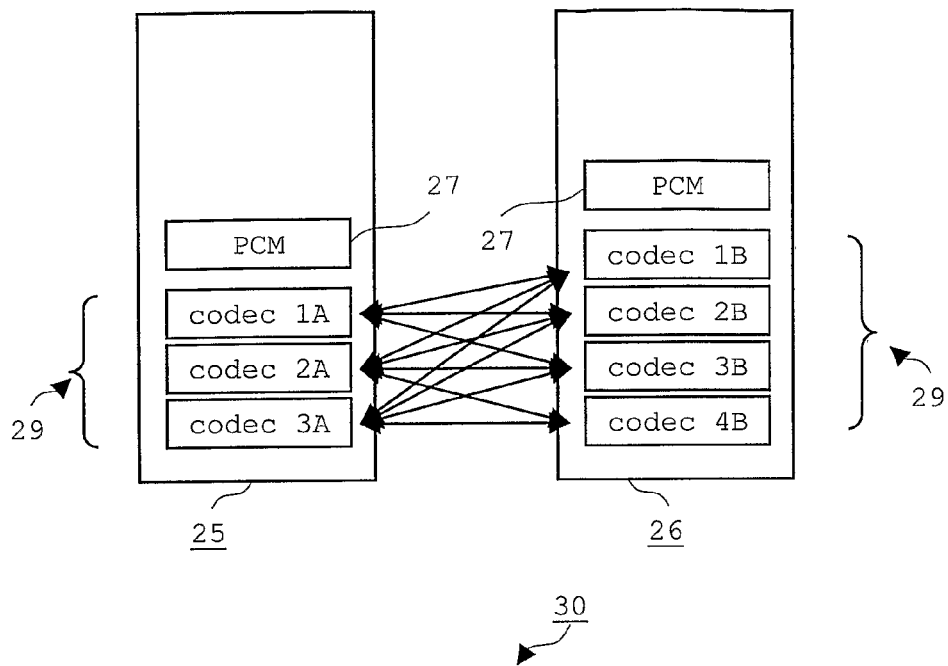

Finally there is the need to account for another special case where none of the supported codec lists 25, 26 contain any direct codes 28 as shown in FIG. 6. This is the typically case for a so-called "island scenario" or in a TFO-TrFO harmonization scenario, where both access links 16: between nodes 10 and 13; and 18: between nodes 11 and 14 are based on the ISUP standard (ISDN User Part). Also here the same mechanism, an priority table 30 as described beforehand, could be used as one example. Another potential method is to select the PCM codec type in that kind of scenarios. Then the bit rate is not optimal, but the speech quality might be best. A scenario with no direct codecs 28 in both the supported codec lists 25, 26 is useful where two transcoding stages are explicitly wanted in order to save bandwidth in the telecommunications core network. Bandwidth savings are requested by some markets and are there regarded as even more important than speech quality.

Now, that the optimal codec type for this communication has been selected by the terminating node 14, a selection can be done, which Codec list to send back to the originating side. According to the state of the art a list sent back to the originating side should only contain codec types that are common to both direct codec lists 28. However, in a preferred embodiment of the invention, for example to be prepared for potential modifications to the communication, e.g. due to handover events or other events, e.g. due to the invocation of supplementary services, it is proposed to return a codec list 26, that comprises all direct codecs and all transcoding codecs of the terminating side.

After this return of the full terminating codec list both sides, the originating and the terminating side have the identical knowledge on the communication scenario and can take this knowledge into account for later selection of codecs.

Like in the state of the art, nodes that are linked into the communication path between the originating node 13 and the terminating node 14 may delete codec types from the codec lists, both in the direction from the originating node 13 to the terminating node 14 and on the way back from terminating node 14 to originating node 13. This enables to get a list comprising only codec that are also supported by any node in the path.

Now, with respect to FIG. 7 and FIG. 8, codec negotiation and selection as well as TFO-TrFO harmonization, the latter being a further benefit from the invention, will be described.

TFO-TrFO harmonization for example defined by 3GPP specifications allow TFO and OoBTC to interwork resulting into a common codec end-to-end even for all cases via transit ISUP/TDM legs.

Figure 7:
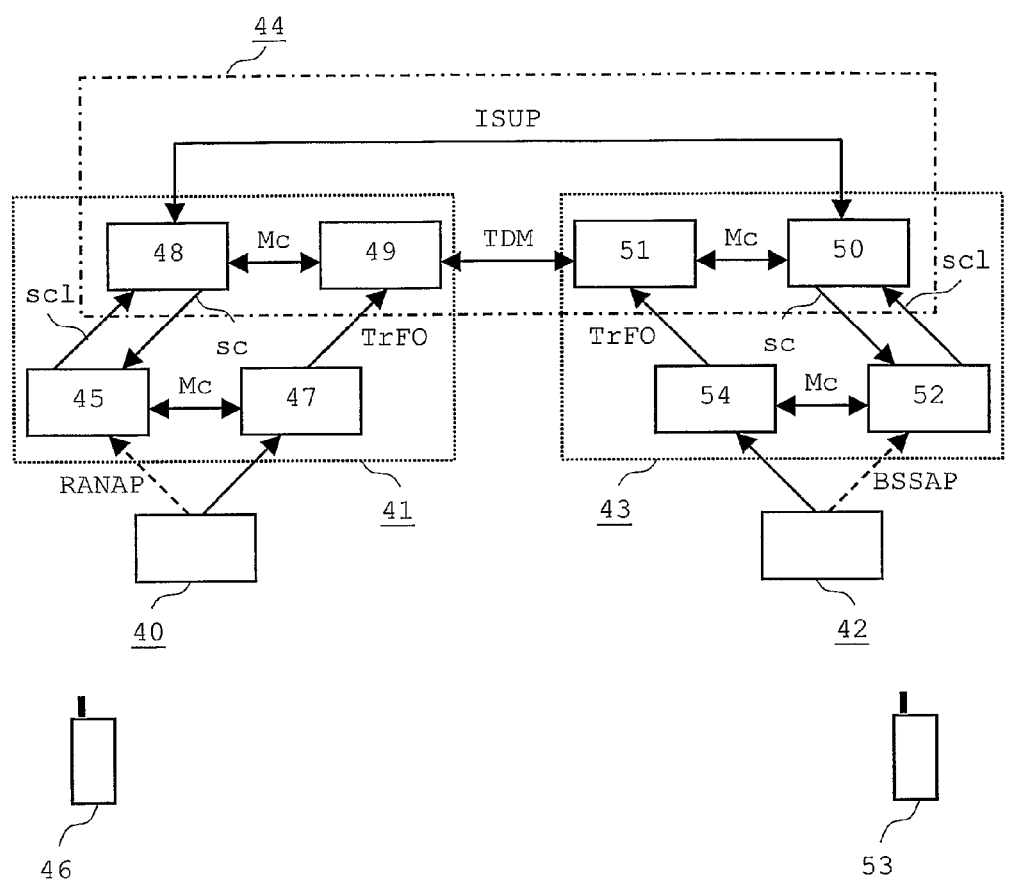

FIG. 7 shows an example scenario of an UTRAN originating access starting from a radio network controller (RNC) 40 where OoBTC is applied on the originating leg 41. The call terminates at a GSM access with its base station controller (BSC) 42. On the terminating leg 43 OoBTC is applied as well. A transiting leg 44 between said originating leg 41 and said terminating leg 43 is based on ISUP and TDM so that OOBTC cannot be applied on that section. However, TFO is supported here.

During a first step of the TFO-TrFO harmonization, which is shown in FIG. 7, i.e. during setup of the call, OoBTC is applied on the originating and terminating legs 41, 43 according to the principles described beforehand. A first originating network node 45, e.g. a mobile switching centre (MSC), generates an initial supported codec list, where the direct codecs are determined by the intersection of the supported codecs of an originating mobile terminal 46 and the capabilities of the first originating network nodes 45 and 47. The transcoding capabilities are determined by a first originating MGW (media gateway) 47, according to a first originating codec list A1. A second originating network node 48, e.g. a TSC-Server, receives the initial supported codec (scl) list from the first origination network node 45. Since the outgoing side is ISUP, OoBTC has to be terminated and a codec has to be selected for the originating leg 41. The transcoding capabilities are determined according to a selected second originating MGW 49, i.e. according to a second terminating codec list A2. The codec to be used (sc) for the originating leg 41 is determined according to the method described in connection with FIG. 5.

On the terminating leg 43 a first terminating network node 50, e.g. another TSC-Server, receives an incoming call setup request via ISUP. OoBTC is started and said first terminating network node 50 generates another initial supported codec list. Since no direct codecs exist, the list starts with the delimiter codec, e.g. the PCM codec, and further comprises all the codecs according to the capabilities of a selected first terminating MGW 51, i.e. codec list B2. Said initial supported codec list is sent (scl) to a second terminating network node 52, e.g. another MSC, which selects (sc) a codec while taking into account all supported direct codecs, i.e. the intersection of the capabilities of both a mobile terminal 53 on the terminating side and said second terminating network node 52, as well as a codec list B1, supported by a selected second terminating MGW 54. The codec is selected according to the method described in connection with FIG. 5, too.

As the originating and terminating legs 41, 43 are isolated from each other, both legs 41, 43 will take independent decisions on the codec to be used.

Figure 8:
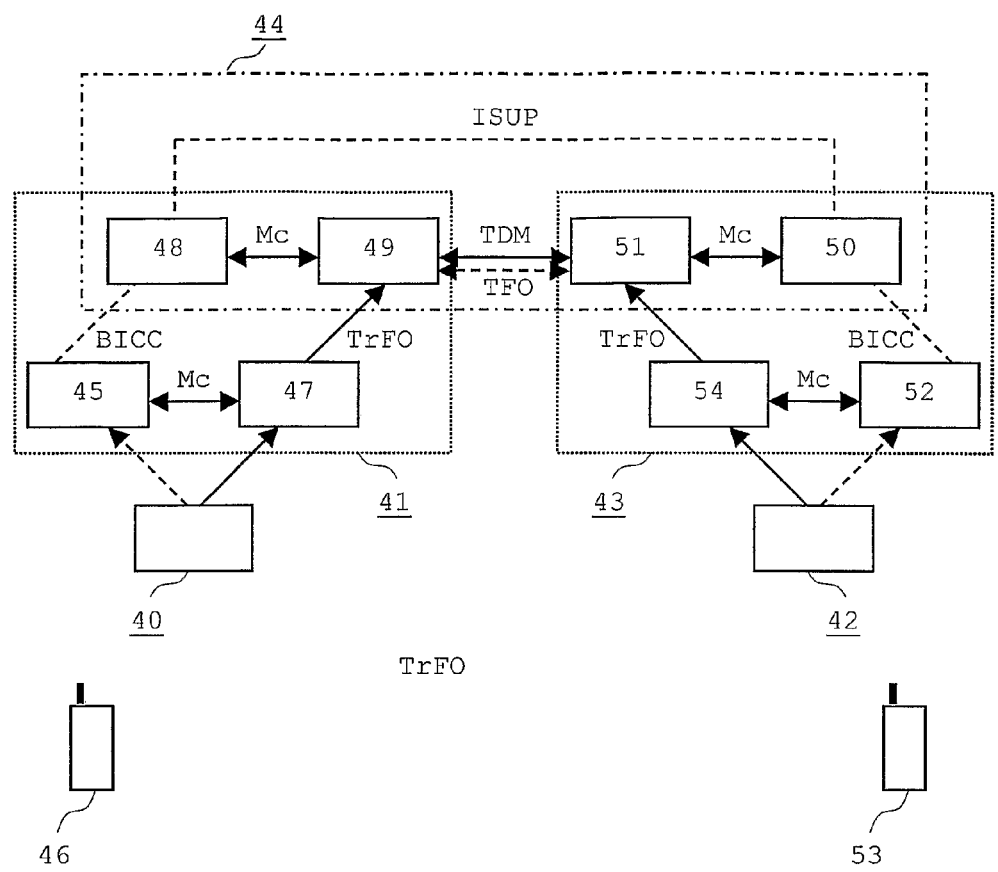
FIG. 8 is a depiction of an exemplary scenario with regard to TFO-TrFO harmonization.

After call setup is finalized and the call is answered, in a second step of TFO-TrFO harmonization, shown in FIG. 8, TFO is triggered inband by both the second originating MGW 49 and the first terminating MGW 51, selected by the respective TSC-Servers 48, 50. The crucial part is which codecs are to be offered via TFO. The TFO codec lists are built in the newly manner proposed by the invention using the PCM codec as a delimiter. This can be achieved by using the "Generic Configuration Frame" as specified in the TFO standard. So the second originating MGW 49 of the originating leg 41 will offer a TFO codec list comprising the selected codec, e.g. codec A, as well the other direct codecs received from the first origination network node 45. Then follows the default codec type as delimiter, e.g. PCM, in the offered TFO codec list, sequenced by all the codecs that are commonly supported by the two MGWs 47, 49 of the originating leg 41 and which are not already in the direct codec part of the TFO codec list. This TFO codec list is called the originating TFO codec list. The first terminating MGW 51 will offer a terminating TFO codec list built in a similar way based on codecs available in the terminating leg 43 and the codec selected in the terminating leg 43, also separated into direct codecs and transcoding codecs.

The TFO codec selection decision rules (based on the standard rule, but modified to handle the new structure of the codec list using the PCM codec as a delimiter) will then either pick the overall best codec or decide that transcoding provides best end-to-end speech quality. If the TFO decision algorithm decides for transcoding no changes are needed on the originating or terminating leg 41, 43. Otherwise the effected leg(s) 41 or 43 or both have to be informed about the decided codec change and In-Call-Modification (part of the specified OoBTC procedures and TFO procedures) has to be triggered on that leg(s) 41 and/or 43 to change the codec.

After the exchange of both TFO Codec Lists, the MGWs 49 and 51 know the overall codec type situation, i.e. they know the direct codecs and transcoding codecs of both so far isolated access legs 41 and 43. They can now determine the overall codec lists of each access side. These codec lists can then be communicated via the OoBTC as described above between node 48 to node 45 and between node 50 to node 52. This is important in order to provide the full codec lists to all nodes to be prepared for any future coming change to the network, which could happen e.g. due to handover events or other events, such as the invocation of supplementary services.

Figure 9:
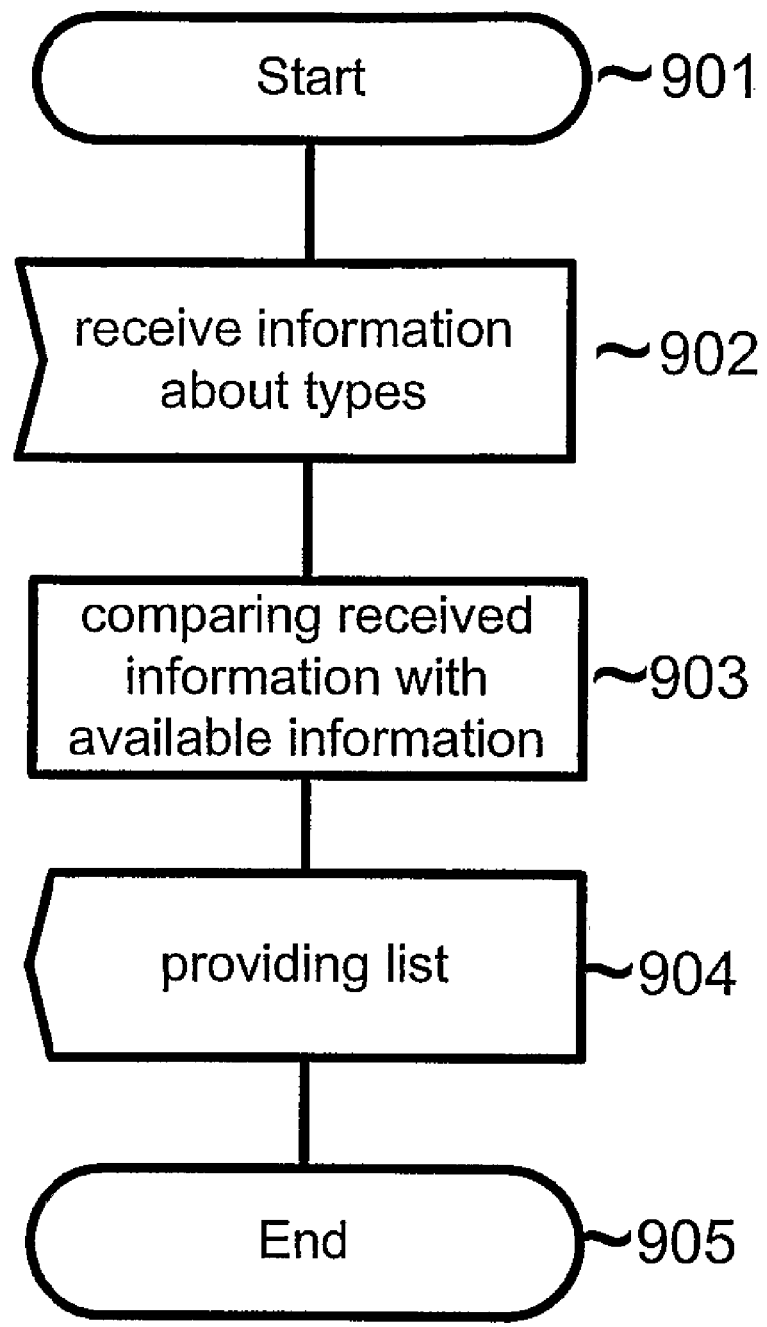
FIG. 9 depicts a flow diagram of an invented method.

FIG. 9 depicts a flow chart of a method as performed by a network node, in particular a network node acting as media-gateway (MGW). The node can participate in a communications path between at least two terminating devices. A terminating device can be a mobile terminal or a server. The communication path is used for transferring media data, i.e. audio data, video data or a combination of both, and said media data is subject to a coding or decoding or both. Coding and decoding are performed by a codec. In a first step 901 the method is started. In a second step 902 node receives information about codecs, i.e. codec types or configurations or both, supported on a section of the communication path from the node to a terminating device.

In a next step 903 the node compares said information with information about codecs, i.e. codec types or configurations or both supported by the node. In a step 904 the node provides a list of codecs supported directly. Directly supported means, that is supported by the terminating device, that it is supported by all network nodes in the section of the communication path involved in coding or decoding or both of said data, and that it is supported by the node itself. The list further comprises codecs that can be used for coding or decoding or both if at least one transcoding is implemented in the communication path. In a final step 905 the method ends. In a preferred embodiment of the invention the list is provided to a device for selecting codecs.

Figure 10:
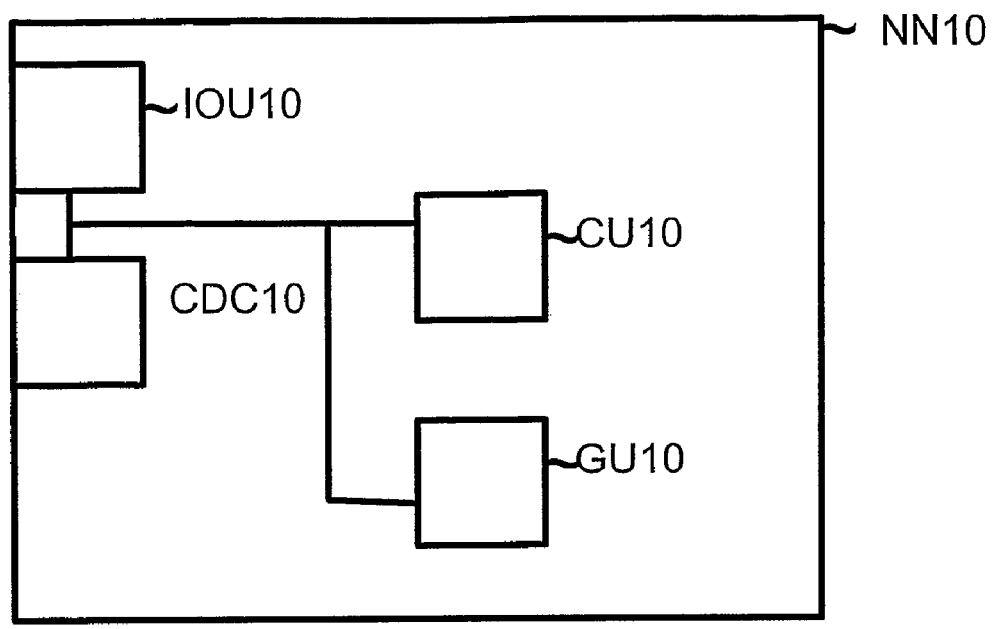
FIG. 10 depicts a network node according to the invention.

FIG. 10 depicts a network node according to the invention.

The node NN10 can be used in a telecommunications network, especially as a network node acting as media-gateway. Said network node can participate in a communication path for transferring media data, wherein media data is audio data or video data or a combination of both. The transferring is performed between terminating devices, wherein a terminating device is a mobile terminal or a server. The node comprises a codec CDC10 for coding or decoding or both of said media data. It further comprises an input/output unit IOU10 for sending and receiving messages. The node comprises furthermore a comparing unit CU10 for comparing information about supported codecs supported by all nodes involved in coding or decoding or both on a section of the communication path from the node to a terminating device and supported by the terminating device, with information of codec types or configurations or both supported by the node itself. The node comprises as well a generation unit GU10 for generating a list of codec types or configurations or both supported by each node of said section of the communication path, supported by the terminating device, and supported by the node itself. The list of codec types or configurations or both generated by said generation unit further comprises codec types and configurations that can be used for coding or decoding only if a transcoding is implemented in the communication path.

In an embodiment of the invention, the generation unit of the node generates a list in which the codec types and configurations that are supported by the terminating device, all network nodes involved in coding or decoding of said media data on the section of the communication path, and the node itself form a first part of the list, and a further part of the list comprises codec types and configurations that can be used for coding or decoding or both of the media data if a transcoding is implemented in the communication path. The two parts of the list are separated by a separator.

Figure 11:
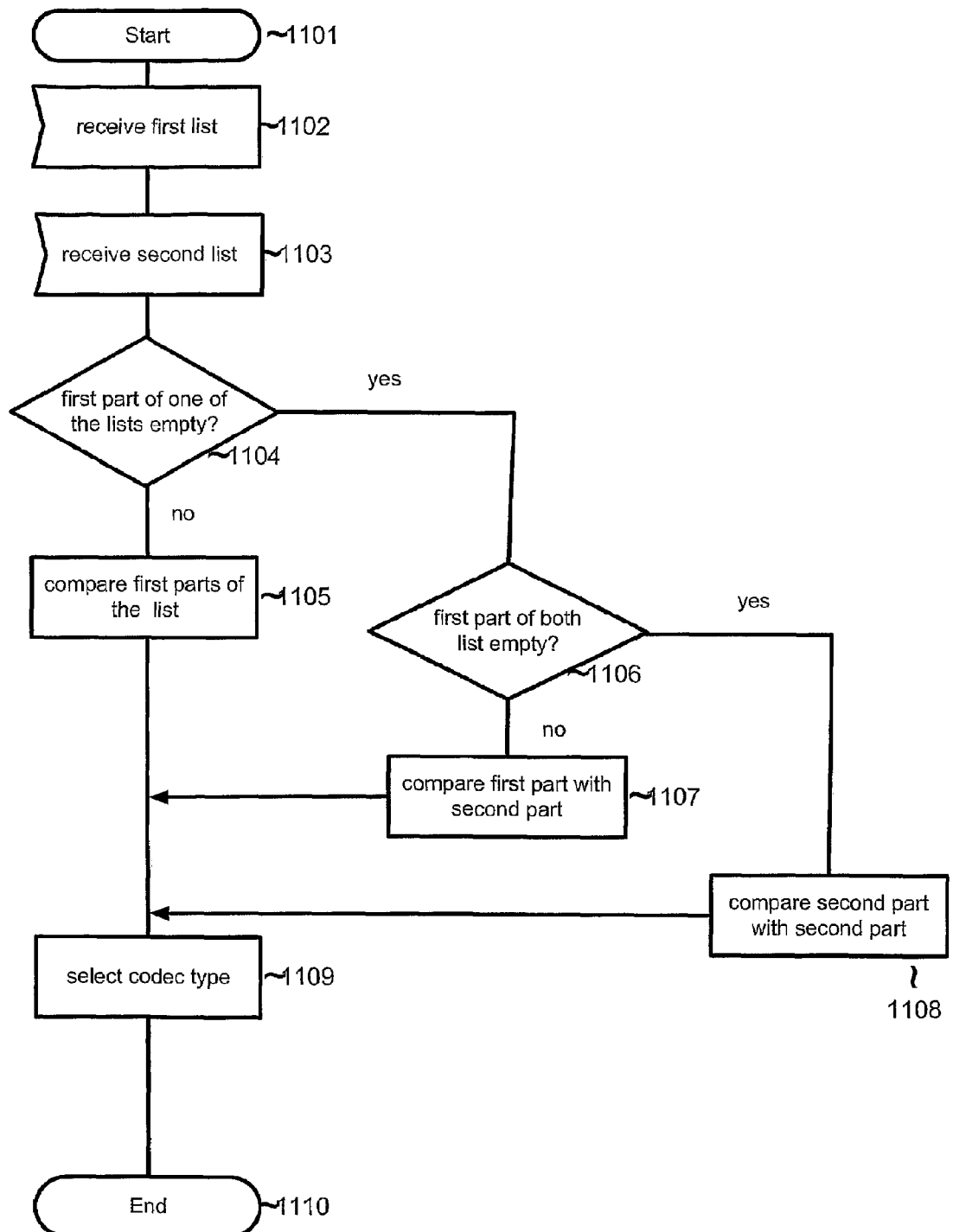
FIG. 11 depicts a flow chart of a further method according to the invention.

FIG. 11 depicts a further method according to the invention.

The method can be performed for example by a device for selecting a codec. In a first step 1101 the method is started. In a next step 1102 the device receives a first list of codecs that are supported on a first call leg of a communication path between two terminating devices. In a further step 1103 the device receives a second list of codecs supported on a second call leg of the communication path. The first call leg connects a first terminating device to a telecommunications network and the second call leg connects a second terminating device to the telecommunications network. The first and the second list each consist of two parts separated by a separator. The first part comprises directly supported codecs wherein the second part comprises codecs that can be used only if a transcoding is implemented in the communication path. In a next step 1104 the device determines whether one of the list comprises a first part, which is empty. That is that on the respective call leg no codec is supported directly, i.e. by all network nodes of the call leg involved in coding or decoding or both, and the terminating device. If none of the lists comprises an empty first part the device compares the first part of each list in a step 1105. If one of the lists has a first part, which is empty the device determines in a further step 1106, whether also the first part of the other list is empty. If it is not empty, the first part that is not empty is compared with the second part of the list with the empty first part in a step 1107. If both lists comprise empty first parts, the device compares the second parts of the lists with each other in a step 1108. In a next step 1109 the device selects at least one codec depending on the result of the comparison 1105, 1107 or 1108. In a preferred embodiment of the invention the selection is performed according to a priority table. The selection is described in more detail above for example by means of FIGS. 4 and 5.

Figure 12:
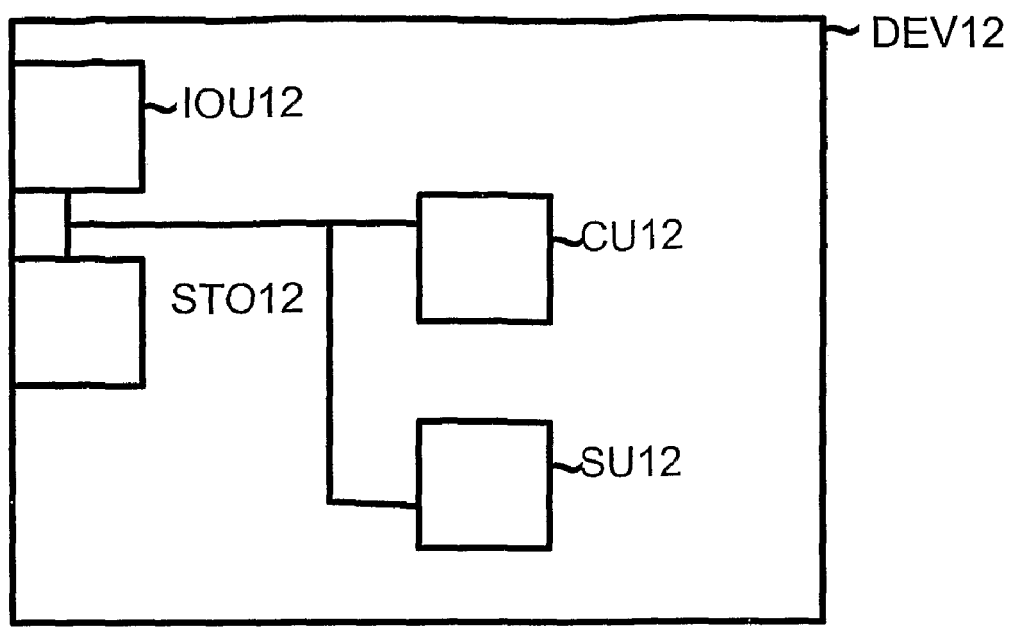
FIG. 12 depicts a device according to the invention.

FIG. 12 depicts a device DEV12 according to the invention. The device DEV12 for selecting at least one of a coder or decoder type or configuration or both for coding or decoding or both of media data. Media data is audio data or video data or a combination of both, that is to be transferred over a communication path between a first and a second terminating device. A terminating device is a mobile terminal or a server, engaged with a telecommunications network. The telecommunications network comprises at least a first and a second network node that are linked into the communication path. The communication path comprises a first call leg to the first terminating device and a second call leg to the second terminating device. The device comprises an input unit CU12 for receiving first list of codec types or configurations or both for the first call leg, and for receiving a second list of codec types or configurations or both for the second call leg. The device further comprises a comparing unit CU12 for comparing the first and the second list that is adapted to detect a separator separating a first part of a list with codec types or configurations or both supported by all nodes involved in coding or decoding or both of media data transferred on the respective call leg and supported by the respective terminating device, and a second part comprising codec types or configurations or both that can be used only if at least one transcoding is implemented in the call leg. The comparing unit CU12 is further adapted to detect if one or both of the lists do not comprise any codec type or configuration in the first part. The device further comprises a selecting unit SU12 for selecting a codec type or configuration or both from the first list and the second list according to a result of the comparing step. The device further comprises a storage STO12 for storing a priority table, used by the selecting unit SU12 for selecting.

Although a preferred embodiment of the invention has been illustrated and described herein, it is recognized that changes and variations may be made without departing from the invention as set forth in the claims.

LIST OF IDENTIFIERS

10 first mobile terminal, originating terminal, communication participant
11 second mobile terminal, terminating terminal, communication participant
12 telecommunications network
13 first network node, originating node, communication participant
14 second network node, terminating node, communication participant
15 communication path
16 segment (of the communication path)
17 segment (of the communication path)
18 segment (of the communication path)
19 coder/decoder (=codec)
20 coder/decoder (=codec)
21 coder/decoder (=codec)
22 coder/decoder (=codec)
23 ((originating) access) codec list
24 ((terminating) access) codec list
25 codec list 26 codec list
27 common codec type
28 direct codec type
29 codec type available after transcoding
30 priority table
31 modified priority table
40 radio network controller (RNC)
41 originating leg
42 base station controller (BSC)
43 terminating leg
44 transiting leg
45 first originating network node
46 originating mobile terminal
47 first originating MGW
48 second originating network node
49 second originating MGW
50 first terminating network node
51 first terminating MGW
52 second terminating network node
53 terminating mobile terminal
54 second terminating MGW

The invention claimed is:

1. A method for transferring media data subject to coding or decoding performed by a codec, the data including audio data, video data or a combination, between at least two terminating devices in a telecommunications network utilizing a network node, the method comprising the steps of:
  receiving information about codecs supported on a communication path between the network node and one of the at least two terminating devices;
  providing a list of codec types or configurations or both that are supported by:
    the network node;
    the one of the at least two terminating devices; and
    all the network nodes in the communication path between the network node and one of the at least two terminating devices;
  comparing the received information about codecs with the list of codec types or configuration or both; and
  utilizing the list of codec types or configurations or both for coding or decoding or both if at least one transcoding is implemented in the communication path, wherein the codec types or configurations or both that are supported directly form a first part of the list and codec types or configurations or both that is used only if the at least one transcoding is implemented form a second part of the list, wherein the first part of the list and the second part of the list are separated by a separator, the separator being a codec type.

2. The method of claim 1, wherein the separator is a default codec type.

3. The method of claim 1, wherein the separator is pulse code modulation (PCM).

4. A network node for transferring media data subject to coding or decoding performed by a codec, the data including audio data, video data or a combination between at least two terminating devices in a telecommunications network, the network node comprising:
  an input output unit for sending and receiving messages;
  receiving information about codecs supported on a communication path between the network node and one of the at least two terminating devices;
  a generation unit for providing a list of codec types or configurations or both that are supported by:
    the network node;
    the one of the at least two terminating devices; and
    all the network nodes in the communication path between the network node and one of the at least two terminating devices;
  a comparing unit for comparing the received information about codecs with the list of codec types or configuration or both; and
  unit for utilizing the list of codec types or configurations or both for coding or decoding or both if at least one transcoding is implemented in the communication path, wherein the codec types or configurations or both that are supported directly form a first part of the list and codec types or configurations or both that is used only if the at least one transcoding is implemented form a second part of the list, wherein the first part of the list and the second part of the list are separated by a separator, the separator being a codec type.

5. The network node of claim 4, wherein the separator is a default codec type.

6. The network node of claim 4, wherein the separator is pulse code modulation (PCM).

7. A method, in a telecommunications network, for selecting at least one of a codec or decoder type for coding or decoding media data including audio data, video data or a combination of both for transfer between a mobile terminal and a server wherein a communication path between the mobile terminal and the server comprises a first call leg to the mobile terminal and a second call leg to the server, the method comprising the steps of;
  receiving or generating a first list of codec types or configurations or both for the first call leg;
  receiving or generating a second list of codec types or configurations or both for the second call leg, wherein the first and second list each comprise a first part with codec types or configurations or both supported by all nodes involved in coding or decoding of media data transferred on the respective call leg and supported by the respective terminating device and a second part comprising codecs or configurations or both that is only used if at least one transcoding is implemented in the first call leg or second call leg;
  detecting a separator between a first part and a second part of the first or the second list, wherein the separator is a codec;
  comparing the first and second list;
  selecting a codec type or configuration or both from the first list; and
  selecting a codec type or configuration or both from the second list.

8. The method of claim 7, wherein the separator is a default codec type.

9. The method of claim 7, wherein the separator is a pulse code modulation (PCM).

10. The method of claim 7, further comprising the step of comparing the first part of the first list and the first part of the second list for determining that the first part of the first list and the first part of the second list each comprise at least one codec type or codec configuration.

11. The method of claim 7, further comprising the step of determining that the first part of the first list or the first part of the second list does not comprise at least one codec type or configuration, wherein the first part of either list that comprises at least one codec type or configuration is compared to the second part of the respective other list.

12. The method of claim 7, further comprising the step of comparing the second part of the first list with the second part of the second list and determining that none of the list comprises a first part with at least one codec type or configuration.

13. The method of claim 7, wherein the selecting steps are performed by evaluating a priority table.

14. The method of claim 13, wherein the priority table is a triangular matrix comprising elements along the matrix diagonal referring to transcoder free transmission and further elements in the upper or lower triangular referring to transmission of data where transcoding is required.

15. A device for selecting one of a coder or decoder type or configuration or both, for coding or decoding or both of media data, including audio data or video data or a combination of both, for transfer between first and second terminating devices connected to a telecommunications network comprising a first network node and a second network node, wherein a terminating device is a mobile terminal or a server and a communication path between the first and the second network node comprise a first call leg to the first terminating device and a second call leg to the second terminating device, the device comprising:

an input unit
 for receiving a first list of codec types or configurations or both for the first call leg, and
 for receiving a second list of codec types or configurations or both for the second call leg;
a comparing unit for comparing the first and second list, wherein the comparing unit is adapted for
 detecting a separator separating a first part and a second part of a list of codec types or configurations or both supported by all nodes involved in coding or decoding or both of media data transferred on a respective call leg and supported by the respective terminating device, the second part comprising codec types or configurations or both that is used only if at least one transcoding is implemented in the respective call leg, and
 detecting if one or both of the lists do not comprise any codec type or configuration in the first part; and
a selecting unit for selecting a codec type or configuration or both from the first list and the second list according to a result of the comparing step.

16. The device of claim 15, further comprising storage for storing a priority table, wherein the selecting unit is adapted to use contents of the priority table for selecting elements referring to transcoder free transmission and further elements referring to transmission of data where transcoding is required.

17. The device of claim 15, wherein the separator is a default codec type.

18. The device of claim 15, wherein the separator is Pulse Code Modulation (PCM).

* * * * *

UNITED STATES PATENT AND TRADEMARK OFFICE
CERTIFICATE OF CORRECTION

PATENT NO. : 7,620,052 B2  Page 1 of 1
APPLICATION NO. : 10/598492
DATED : November 17, 2009
INVENTOR(S) : Witzel et al.

It is certified that error appears in the above-identified patent and that said Letters Patent is hereby corrected as shown below:

In Fig. 10, Sheet 10 of 12, delete " 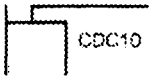 " and insert --  --, therefor.

In Fig. 12, Sheet 12 of 12, delete "  " and insert --  --, therefor.

In Column 5, Line 1, delete "both." and insert -- both, --, therefor.

In Column 5, Line 24, delete "harmonization." and insert -- harmonization, --, therefor.

In Column 6, Line 34, delete "11:" and insert -- 11. --, therefor.

In Column 7, Line 35, delete "UMTS_AMR2" and insert -- UMTS_AMR2. --, therefor.

In Column 8, Line 65, delete "B2" and insert -- B2. --, therefor.

In Column 10, Line 44, delete "an" and insert -- a --, therefor.

In Column 11, Line 25, delete "OOBTC" and insert -- OoBTC --, therefor.

In Column 14, Line 21, delete "CU12" and insert -- IOU12 --, therefor.

In Column 15, Line 21, delete "MGW" and insert -- MGW. --, therefor.

Signed and Sealed this

Sixteenth Day of March, 2010

David J. Kappos
*Director of the United States Patent and Trademark Office*